Figure 4:
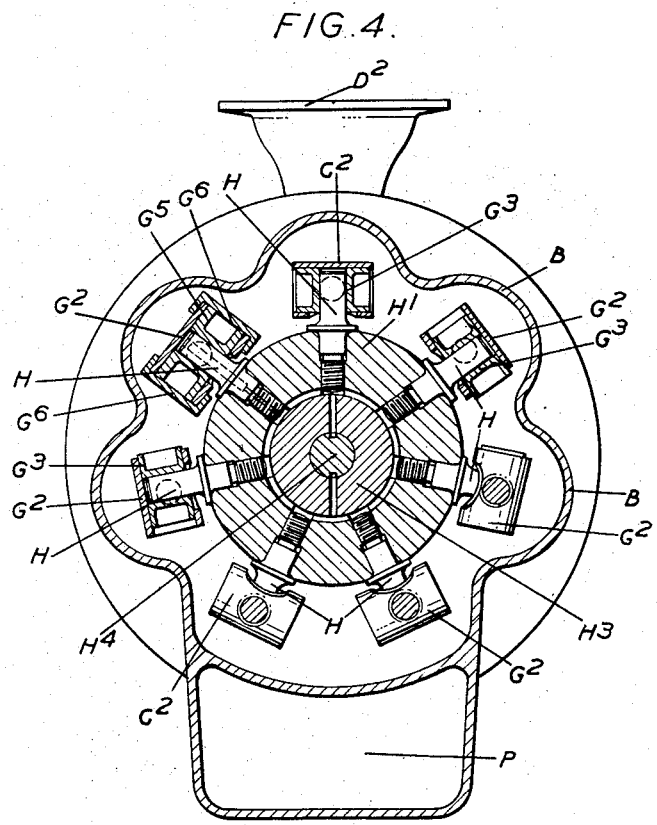

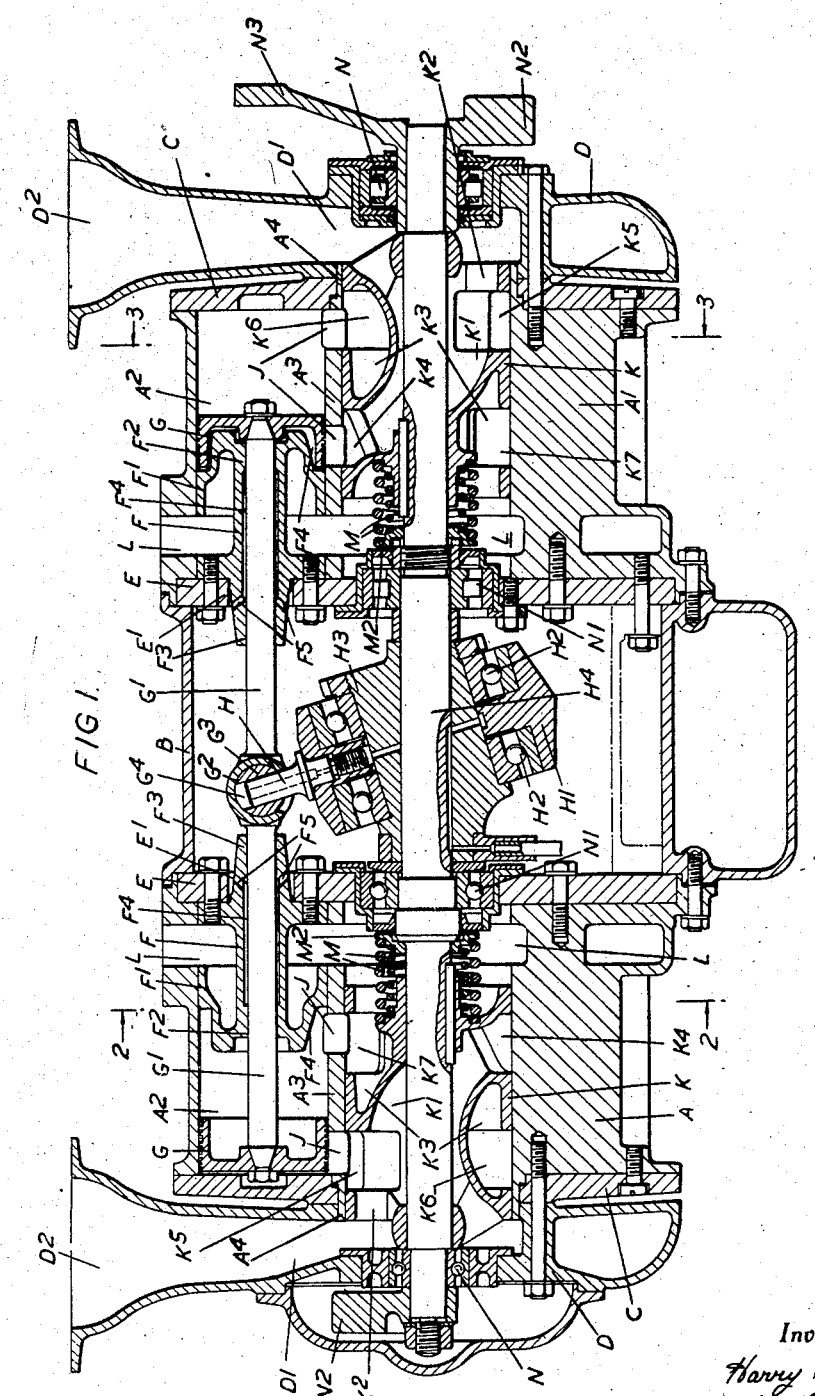

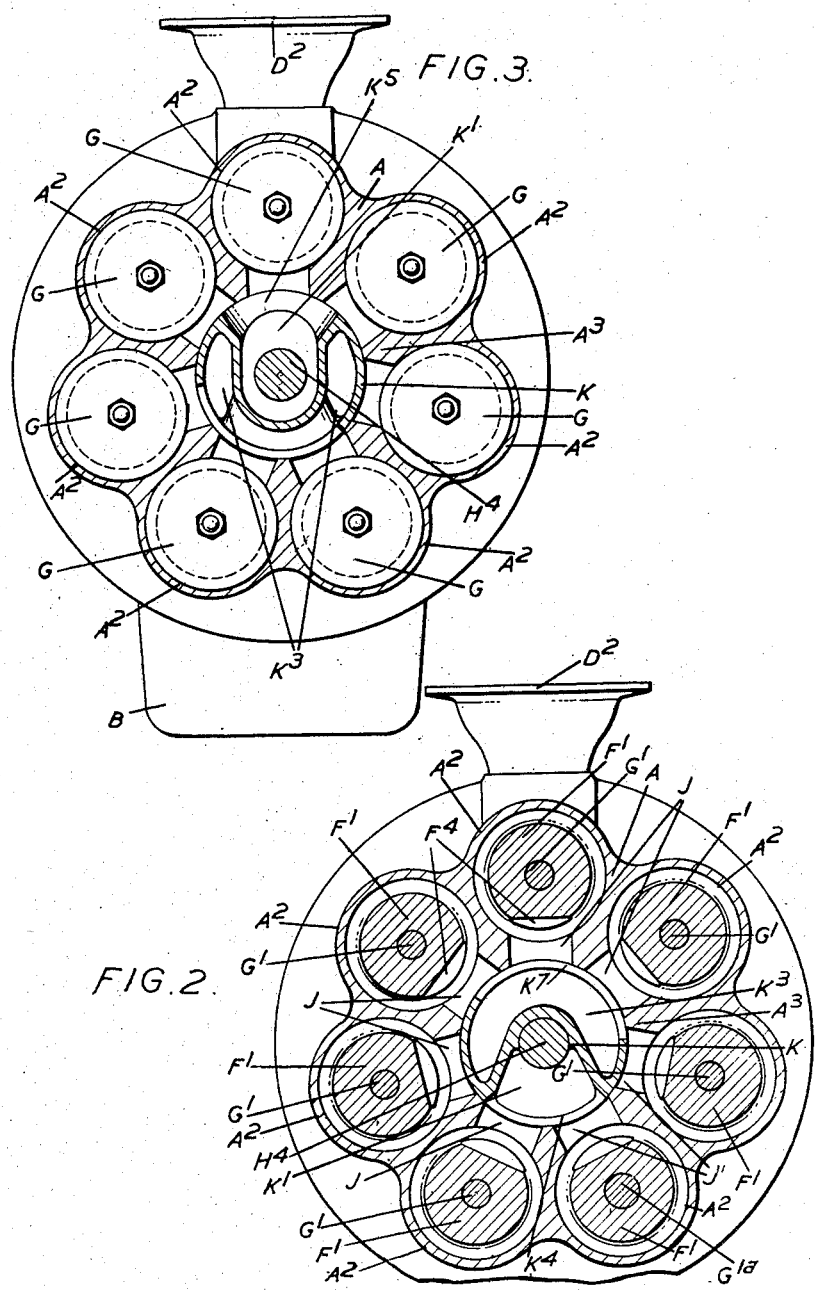

April 14, 1959  H. R. RICARDO  2,881,973
COMPRESSORS FOR AIR OR OTHER GAS

Filed Aug. 4, 1952  6 Sheets-Sheet 3

Inventor
Harry R. Ricardo
By Watson, Cole, Grindle
  Watson
        Attorneys

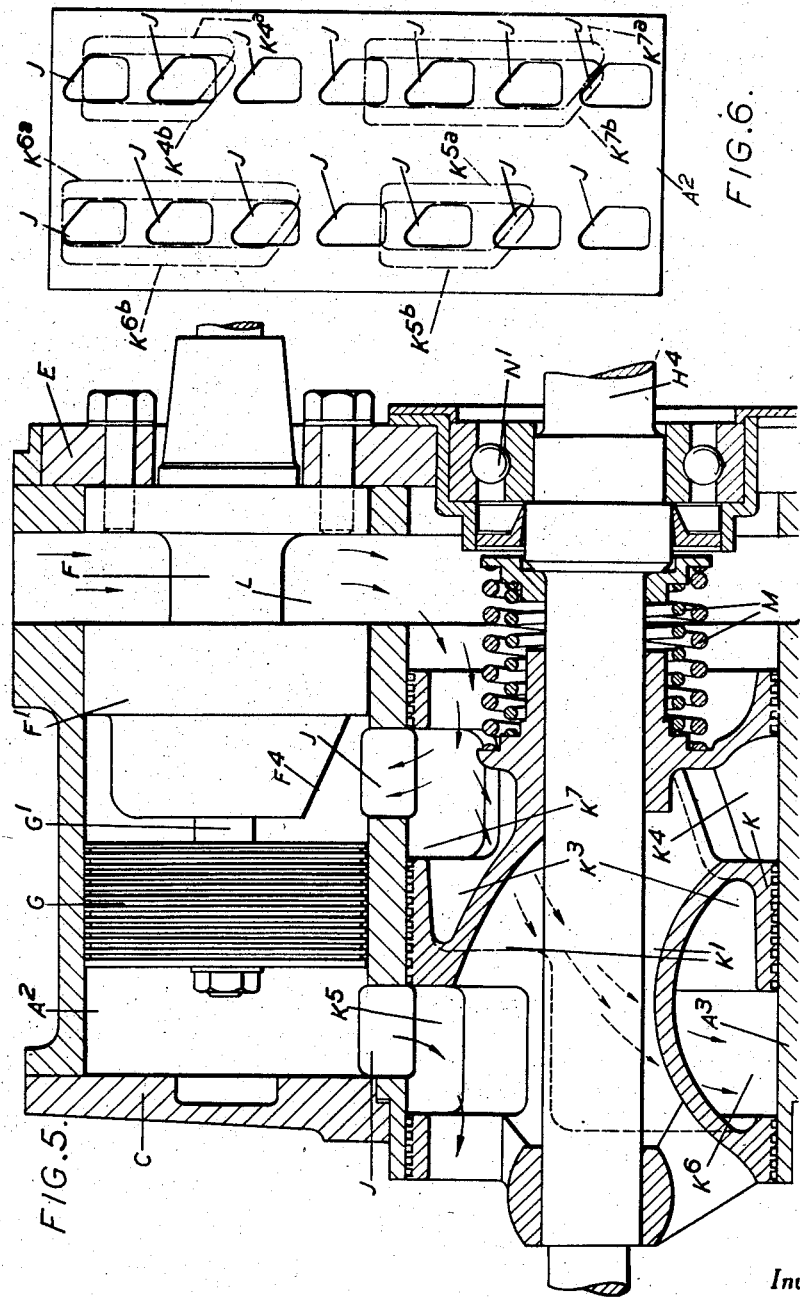

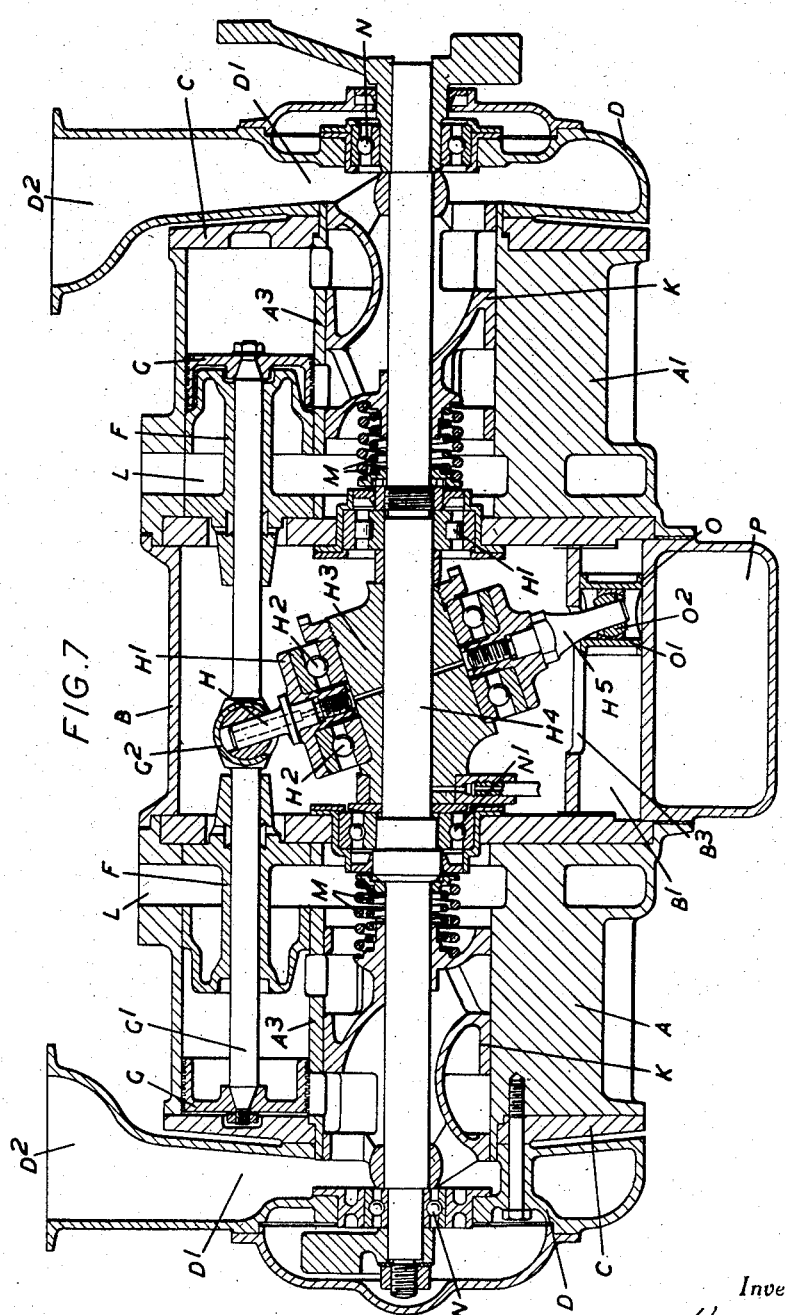

April 14, 1959　　　H. R. RICARDO　　　2,881,973
COMPRESSORS FOR AIR OR OTHER GAS
Filed Aug. 4, 1952　　　　　　　　　　　6 Sheets-Sheet 6

Inventor
Harry R. Ricardo
By Watson, Cole, Grindle
Watson
Attorneys

United States Patent Office 2,881,973
Patented Apr. 14, 1959

2,881,973
COMPRESSORS FOR AIR OR OTHER GAS

Harry Ralph Ricardo, London, England, assignor to Ricardo & Co. Engineers (1927) Limited, London, England, a company of Great Britain Application August 4, 1952, Serial No. 302,474

Claims priority, application Great Britain August 8, 1951

1 Claim. (Cl. 230—186)

This invention relates to compressors for air or other gas of the kind comprising a series of working cylinders arranged with their axes lying around and parallel to the axis of a driving shaft which is arranged to operate a swashplate or wobble plate by means of one of the well-known mechanisms such as that usually called a Z crank, the pistons being connected to the swashplate or wobble plate so as to be reciprocated thereby in the cylinders.

For convenience herein it will be assumed that the gas to be compressed is air and the compressor will be referred to as an air compressor while the plate by which the pistons are caused to reciprocate will be called a wobble plate.

An object of the invention is to provide a form of air compressor of the kind referred to which will be simple in construction and operation, will be compact and comparatively light in weight and will tend to maintain its efficiency over long periods of operation and to require little or no lubrication for its working pistons so as to be suitable for supplying air uncontaminated with lubricant.

A compressor for air or other gases according to the present invention comprises a block of working cylinders lying closely around a cylindrical valve housing with their axes parallel to the axis of the valve housing and with at least one combined suction and discharge port at each end of each cylinder leading directly into the interior of the valve housing, an externally cylindrical rotary valve member mounted within the valve housing and having inlet and discharge chambers within it the opposite ends of each of which communicate with ports in the circumferential wall of the valve member lying in the same plane respectively as the ports in the opposite ends of the cylinders, the inlet chamber communicating through one end of the valve member with an inlet port or passage while the discharge chamber communicates through the other end of the valve member with a discharge port or passage, double-acting pistons arranged to reciprocate within the cylinders and having piston rods which pass in a substantially gas-tight manner through guides in the ends of the cylinders at one end of the block and a driving shaft which is coaxial with the valve member, is arranged to operate a wobble plate connected to the outer ends of the piston rods, and is connected to the valve member so as to cause rotation thereof.

According to another feature of the invention the guides through which the piston rods pass are of substantial length and make such a close working fit with the piston rods that they maintain the pistons substantially out of contact with the cylinders whereby the pistons are enabled to operate substantially without lubricant. Moreover this arrangement permits the pistons and cylinders to be made of some light alloy such as an aluminium alloy since there is no contact between them, while the piston rods are formed of steel or other metal having sufficiently good bearing qualities when used in association with a light alloy such as aluminium so that the guides and the part or parts in which they are formed can also be formed of a similar light alloy.

Preferably, according to a further feature of the invention, the rotary valve member is mounted on the driving shaft in such a manner that the shaft positions and supports the valve member within the valve housing so that this valve member does not make contact with the housing. Thus the valve member also can operate substantially without lubrication and it and the housing can be made of a light alloy such as aluminium alloy.

Moreover in such an arrangement the pistons and the valve member are preferably not provided with circumferential packing rings or like packing members but are each provided with a series of closely spaced narrow circumferential grooves constituting in effect labyrinth seals over the surfaces across which the escape of gas is to be minimised or prevented.

Figure 8:
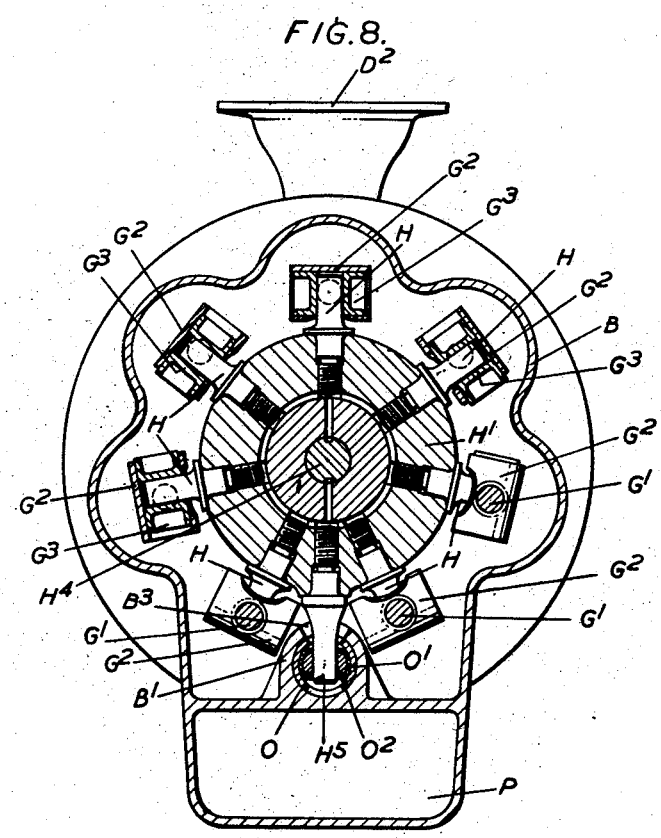

The details of construction may vary considerably but one form of air compressor according to the invention, and a modification thereof, are illustrated by way of example in the accompanying drawings, in which Figure 1 is a sectional side elevation of the compressor, the section being taken in a plane containing the axis of the main shaft, Figure 2 is a cross section on the line 2—2 of Figure 1, the pistons for convenience being assumed all to be at intermediate points in their respective strokes, Figure 3 is a section on the line 3—3 of Figure 1 the pistons again for convenience being assumed to be at intermediate points in their respective strokes, Figure 4 is a cross section in the general plane of the wobble plate so as to show the general form of the connections between the piston rods and the wobble plate, Figure 5 is an enlarged cross sectional view of one of the rotary valves, its housing and one of the cylinders taken in a plane containing the axes of the valve and cylinder, Figure 6 is a development showing the form and arrangement of the ports in the valve and in the cylinders with which it is associated, Figure 7 is a similar view to Figure 1 showing the modified form of compressor, and Figure 8 is a similar cross sectional view to Figure 4 taken through the wobble plate of the construction shown in Figure 7.

In the construction shown in Figures 1 to 6, the compressor comprises a pair of similar cylinder blocks A and $A^1$ formed for example of cast aluminium alloy and each comprising seven cylinders $A^2$ evenly spaced around a cylindrical valve housing $A^3$ formed in the cylinder block with its axis parallel to the axes of the cylinders and having a bore somewhat larger than the bore of each cylinder and a length approximately equal to that of each cylinder.

The two cylinder blocks A and $A^1$ are secured to opposite ends of an intermediate housing B and each cylinder block has secured to its outer end an annular end plate C which closes the outer ends of the cylinders $A^2$ and through the central aperture of which a short extension $A^4$ of the valve housing $A^3$ projects. Secured to the outer face of each of the end plates C is a box section casting D, also conveniently of aluminium alloy, which contains a discharge passage $D^1$ into the inner end of which the adjacent end of the valve housing $A^3$, $A^4$ opens as shown, this discharge passage having a lateral exit opening $D^2$.

Secured to the inner end of each cylinder block A and $A^1$ so as to lie between it and the intermediate housing B is a plate having a central aperture therein surrounded by a series of seven circumferentially displaced apertures $E^1$ each of which is concentric with one of the cylinders $A^2$. Secured to each plate E so as to project through the apertures $E^1$ are tubular members F each connected by a circumferential flange to the plate and having a mushroom-like head $F^1$ which makes a fluid seal with the bore of the cylinder into which it projects so as to form in effect an inner cylinder head.

Disposed for reciprocation within each cylinder $A^2$ is a piston G in a cylinder $A^2$ in the cylinder block A being connected to one end of a piston rod member $G^1$ the other end of which is connected to the piston G in the coaxial cylinder in the block $A^1$.

Each piston rod member $G^1$ passes through the tubular members F associated with the inner ends of the cylinders in which its pistons operate and, as will be seen, each of these tubular members is of substantial length and has parts $F^2$, $F^3$ at its ends with which the piston rod member makes a close clearance sliding fit while its central part freely surrounds the piston rod member to provide an annular chamber $F^4$ to which lubricant-laden air has access and from which lubricant can drain through passages $F^5$. The length of each of the tubular members F is in fact substantially greater than the stroke of each of the pistons G while the length of the annular chamber $F^4$ is equal or nearly equal to the length of the stroke of each piston. It will thus be seen that the piston rod members $G^1$ are supported in effect in the two relatively short bearing parts $F^2$, $F^3$ while most or substantially all of any oil which may pass the bearing part $F^3$ will tend to collect in the chamber $F^4$ and be drained away through the passages $F^5$.

As will be apparent the form of the part of each of the mushroom like heads $F^1$ of the members F which a piston closely approaches at the appropriate end of its stroke is such as to leave only a very small dead space between it and the adjacent face of the piston.

Each of the piston rod members $G^1$ is formed at the centre of its length with a cylindrical housing $G^2$ in which is mounted to rock a cylindrical coupling member $G^3$, six of which coupling members are identified by the reference letter $G^3$, while the seventh is of slightly different dimensions from the others and is identified by the reference letter $G^5$. Each coupling member $G^3$ and $G^5$ has a transverse bore $G^4$ therein in which is mounted to rotate and reciprocate a pin H projecting radially from a wobble plate $H^1$ supported on bearings $H^2$ on a member $H^3$ rigidly mounted on a main shaft $H^4$ and representing in effect a so-called Z crank on that shaft by which the wobble plate has the appropriate motion imparted to it.

As will be apparent from Figure 4, each of the coupling members $G^3$ is arranged so that it is free to slide axially to a limited extent within its housing $G^2$ so as to allow for limited circumferential movement of each of the associated pins H relatively to its piston rod member. In the case of the one coupling member $G^5$, however, the associated housing $G^2$ has end caps $G^6$ secured to and closing its ends and serving to prevent axial movement of the coupling member $G^5$ therein. The connection thus provided between the piston rod member and the wobble plate and including the coupling member $G^5$ thus serves to restrain the wobble plate from circumferential movement at the point of connection. Since this restraint imposes on the associated piston rod member $G^1$ a certain lateral stress, the associated piston rod member is of somewhat larger diameter than the other piston rods as shown at $G^{1a}$ in Figure 2.

Each end of the valve housings $A^3$ communicates with the adjacent end of each of the cylinders $A^2$ through a combined suction and discharge port J, the part of each of the head members $F^1$ which lies adjacent to such a port being cut away as indicated at $F^4$ to facilitate the flow of gas through the port when the piston G closely approaches the member $F^1$.

Mounted for rotation in each of the valve housings $A^3$ is a rotary valve member K having formed therein a discharge chamber $K^1$ opening through the outer end of the valve as indicated at $K^2$, and a suction chamber $K^3$ which opens through the inner end of the valve housing into a suction chamber or passage L. The discharge chamber $K^1$ communicates with two discharge ports $K^4$, $K^5$ in the wall of the valve, these ports lying at diametrically opposite sides of the valve and respectively in the planes of the combined inlet and discharge ports at the ends of the associated cylinders. Similarly the suction chamber $K^3$ communicates with two suction ports $K^6$, $K^7$ also disposed at diametrically opposite sides of the valve and lying respectively in the planes of the combined inlet and discharge ports J at the ends of the associated cylinders. As will be clear, more especially from Figure 5, the discharge chamber $K^1$ passes in effect through the centre of the suction chamber $K^3$ so as to provide for the required communication of each of these chambers with the appropriate ports situated towards opposite ends of the valve.

Each of the valves K is mounted upon the main shaft $H^4$ and coupled thereto by a key or splines in a manner permitting it to move axially but not to rotate thereon, and a pair of springs M, is associated with each valve and acts at one end on the valve and at its other end on a thrust member $M^2$ on the shaft $H^4$ so as to tend to move the valve always towards the associated discharge passage $D^1$.

The main shaft $H^4$ is supported in bearings N, $N^1$ respectively in the castings D and the plates E, each of the bearings N also constituting a stop to limit the travel of the adjacent valve K under the action of its springs M, and balancing members $N^2$ are mounted on the ends of the main shaft to provide a couple during operation in opposition to that arising due to the motion of the wobble plate and pistons. One of these balancing members may also constitute part of a driving connection by which the main shaft is driven, as indicated at $N^3$.

The connecting rod members $G^1$ have such a close clearance fit in the tubular guide members F at the points $F^2$ and $F^3$ that they support and locate the pistons G within their cylinders $A^2$ in such manner that the pistons tend not to make contact with the cylinders and are thus enabled to operate substantially without lubrication. The pistons therefore, have no piston rings or equivalent sealing members but are preferably each provided with a series of closely spaced circumferential grooves as shown clearly in Figure 5 constituting in effect a labyrinth packing.

If desired, each valve member K may also be provided with a series of closely spaced circumferential grooves in its circumferentially complete areas as indicated in Figure 5 and in any case each valve is preferably supported upon the main shaft in such manner that it can operate substantially without lubrication between its circumferential surface and the wall of the valve housing $A^3$.

It will be apparent from the above description that the pressure in each of the delivery passages $D^2$ acts on the end of the associated valve K remote from the springs M and that, if the force applied by the springs be appropriately determined in relation to the range of delivery pressures at which the compressor is to operate, each valve K will, over the higher part at least of the range of delivery pressures, move axially against the action of its springs M with increases in the delivery pressure so that its axial position at any moment will in fact be determined by the delivery pressure.

Each of the ports J, $K^4$, $K^5$, $K^6$ and $K^7$ has a leading edge, that is to say, the edge at which during operation the port first begins to open, which is inclined to lines parallel to the axis of the valve as shown in Figure 6, in which the ports J are shown in full line and the ports $K^4$, $K^5$, $K^6$ and $K^7$ are shown in chain line and, for illustration purposes, in two alternative axial positions, that is to say in the positions relatively to the parts J which they occupy respectively when the valve K is in the limiting position shown in Figure 5 and when it is in its other limiting position in which the springs M are compressed to the full extent permitted by the limited axial movement allowed to the valve K.

It will be apparent from Figure 6 that when the valve K occupies the position shown in Figure 5, that is to say the position it will occupy over the lower range of delivery pressures, the ports $K^4$, $K^5$, $K^6$ and $K^7$ then being in the position indicated by the reference letters $K^{4b}$, $K^{5b}$, $K^{6b}$, $K^{7b}$ in Figure 6, each of the ports J will come into communication with each of the ports $K^4$, $K^5$, $K^6$, and $K^7$ somewhat sooner in each cycle than will be the case when the valve K is moved to the right in Figure 5 against the action of its springs M due to the delivery pressure exceeding a predetermined value and appreciably sooner than will be the case when the valve K is moved to the limit of its travel against the action of the springs M due to the delivery pressure exceeding some predetermined maximum.

Thus, over the higher range of delivery pressures at least, each delivery port $K^4$, $K^5$ will open later when the delivery pressures are higher than when they are lower and the arrangement is preferably such that the point at which each of these ports comes into communication with each of the ports K will always be approximately that at which the delivery pressure in the cylinder from which the port J opens is approximately equal to the pressure in the discharge passage $D^1$.

It will be apparent that the suction ports will also open somewhat later when the delivery pressure is high than when it is low. The compressor thus includes the invention forming the subject of my copending United States Patent No. 2,671,606. It will be seen that both the suction and delivery ports close at the same moment irrespective of the delivery pressure, that is to say, at approximately the ends of the piston strokes.

In the modification shown in Figures 7 and 8 the general construction of the compressor is similar to that shown in Figures 1 to 6 except for minor details and for certain modifications hereinafter referred to and the same reference letters have therefore been used for the corresponding principal parts and the general construction and arrangement of these parts will be clear from the above description of the construction shown in Figures 1 to 6 and will not be again described.

The construction shown in Figures 7 and 8 differs from that shown in Figures 1 to 6 mainly in the following respects:

The piston rod members $G^1$ are all of the same diameter, the connection constituted by the housings $G^2$, the coupling members $G^3$ and the pins H between each piston rod member and the wobble plate $H^1$ being all of the kind in which the coupling member $G^3$ is permitted limited axial movement within its housing $G^2$ to allow for the movement of the wobble plate. In addition separate means are provided for restraining the wobble plate from rotational movement. These means comprise an axially extending cylindrical bore $B^1$ formed within the wall of the housing B and having a slot $B^3$ in its inner wall to permit the passage of a restraining pin $H^5$ rigidly secured to the wobble plate $H^1$. Mounted to reciprocate freely within the cylindrical bore $B^1$ is an externally cylindrical slide member O within which is rigidly mounted the outer member $O^1$ of a self-aligning spherical joint, the inner member $O^2$ of which has a bore therein which is freely engaged by the pin $H^5$ in a manner permitting the pin to slide through the bore.

It will thus be seen that the pin $H^5$, the slide member O and the connection $O^1$, $O^2$ in effect perform the same function as is performed by the pistons and piston rod member, the housing $G^2$, $G^6$ and the pin H associated with the coupling member $G^5$ in the construction shown in Figures 1 to 6.

In each of the constructions illustrated an oil sump P may be provided from which lubricating oil is fed by suitable means to the bearings of the main shaft, the wobble plate, and the mechanism connecting the wobble plate with the piston rods, other parts of the mechanism being lubricated by oil derived from the oil-laden atmosphere within the casing B.

What I claim as my invention and desire to secure by Letters Patent is:

A gas compressor including in combination at least one cylinder free from lubricant, a piston rod guide in one end of the cylinder, a piston devoid of piston rings reciprocable within the cylinder, said piston being provided with a series of continuous circumferential grooves, said grooves being spaced from each other and from the ends of the piston and constituting labyrinth packing means between the piston and the cylinder, the external diameter of said piston being less than the internal diameter of the cylinder, the difference in such diameters being no greater than required to afford mechanical clearance between the piston and cylinder, a piston rod secured to said piston, said rod passing through said guide and having a fluid-tight working fit therein, and means external to said cylinder and including a driving shaft having its axis parallel to the axis of said cylinder and a wobble plate operated by said driving shaft and operatively connected with said piston to impart reciprocating movement to said rod and piston while imposing small lateral thrust on said piston rod, said guide having a length greater than the length of the stroke of said piston and sufficient to maintain the piston out of contact with the cylinder, whereby the piston may operate without lubricant, the center part of the bore of the said guide being cut away to provide an annular chamber surrounding the piston rod and having a length at least equal to the length of the stroke of the piston rod, said chamber being formed to provide at least one drain hole leading from the interior of the chamber to a point outside the cylinder.

References Cited in the file of this patent
UNITED STATES PATENTS

| Number | Name | Date |
|---|---|---|
| 715,108 | Meredith | Dec. 2, 1902 |
| 787,087 | Dumas | Apr. 11, 1905 |
| 844,734 | Mullan | Feb. 19, 1907 |
| 1,233,438 | Barengueras | July 17, 1917 |
| 1,327,895 | Apostoloff | Jan. 13, 1920 |
| 1,430,581 | Parsons | Oct. 3, 1922 |
| 1,526,909 | Hiller | Feb. 17, 1925 |
| 1,991,460 | Herzmark | Feb. 19, 1935 |
| 2,291,243 | Levy | July 28, 1942 |
| 2,479,876 | Sherman | Aug. 23, 1949 |
| 2,668,656 | Booth et al. | Feb. 9, 1954 |
| 2,782,081 | Entwistle | Feb. 19, 1957 |
| 2,839,241 | Kurtz | June 17, 1958 |

FOREIGN PATENTS

| Number | Country | Date |
|---|---|---|
| 8,760 | Great Britain | Apr. 16, 1904 |
| 41,392 | Sweden | of 1914 |
| 61,271 | Switzerland | of 1912 |
| 163,857 | Great Britain | of 1921 |
| 186,918 | Switzerland | Oct. 15, 1936 |
| 357,066 | Great Britain | Sept. 17, 1931 |